US011267653B2

(12) United States Patent
Helsel et al.

(10) Patent No.: US 11,267,653 B2
(45) Date of Patent: Mar. 8, 2022

(54) MODULAR MULTIFUNCTIONAL WORKCELLS FOR AUTONOMOUS GUIDED VEHICLE APPLICATIONS

(71) Applicant: Google LLC, Mountain View, CA (US)

(72) Inventors: Michael Helsel, Seattle, WA (US); Ned Lecky, Bellevue, WA (US); Avinash Panga, Woodinville, WA (US); Adam Morton, Kirkland, WA (US)

(73) Assignee: Google LLC, Mountain View, CA (US)

( * ) Notice: Subject to any disclaimer, the term of this patent is extended or adjusted under 35 U.S.C. 154(b) by 214 days.

(21) Appl. No.: 16/594,700

(22) Filed: Oct. 7, 2019

(65) Prior Publication Data

US 2021/0101748 A1 Apr. 8, 2021

(51) Int. Cl.
*B65G 1/137* (2006.01)

(52) U.S. Cl.
CPC .................. *B65G 1/1375* (2013.01)

(58) Field of Classification Search
CPC .................................................... B65G 1/1375
See application file for complete search history.

(56) References Cited

U.S. PATENT DOCUMENTS

| | | | |
|---|---|---|---|
| 7,890,228 B2 | 2/2011 | Redmann, Jr. et al. | |
| 8,527,153 B2 | 9/2013 | Doan | |
| 8,751,147 B2 | 6/2014 | Colwell | |
| 8,965,561 B2 | 2/2015 | Jacobus et al. | |
| 9,002,506 B1* | 4/2015 | Agarwal | G06Q 10/087 700/216 |
| 9,656,806 B2* | 5/2017 | Brazeau | B25J 5/007 |
| 9,733,646 B1 | 8/2017 | Nusser et al. | |
| 9,776,326 B2 | 10/2017 | Zevenbergen et al. | |
| 2013/0054005 A1* | 2/2013 | Stevens | G06Q 10/087 700/216 |
| 2017/0368684 A1 | 12/2017 | Zevenbergen et al. | |
| 2019/0243383 A1 | 8/2019 | Cantrell et al. | |

OTHER PUBLICATIONS

EP Extended Search Report in European Application No. 20200516.1, dated Feb. 24, 2021, 7 pages.

* cited by examiner

*Primary Examiner* — Kyle O Logan
(74) *Attorney, Agent, or Firm* — Fish & Richardson P.C.

(57) ABSTRACT

Methods, systems, and apparatus for transporting workcells. In one aspect, a system includes a first fleet of AGVs that each include electro-mechanical interface that is adapted to (i) connect to or lift multiple different types of workcells and (ii) provide charging power to or receive charging power from multiple different types of workcells. A second fleet of multiple different types of workcells are each adapted to perform one or more particular tasks. A control system is configured to identify a set of tasks to be performed by the second fleet of workcells and, for each task, select a workcell to perform the task, select an AGV to transport the selected workcell to a location at which the task is to be performed, and provide, to the selected AGV, instructions that cause the selected AGV to transport the selected workcell to the location at which the task is to be performed.

17 Claims, 10 Drawing Sheets

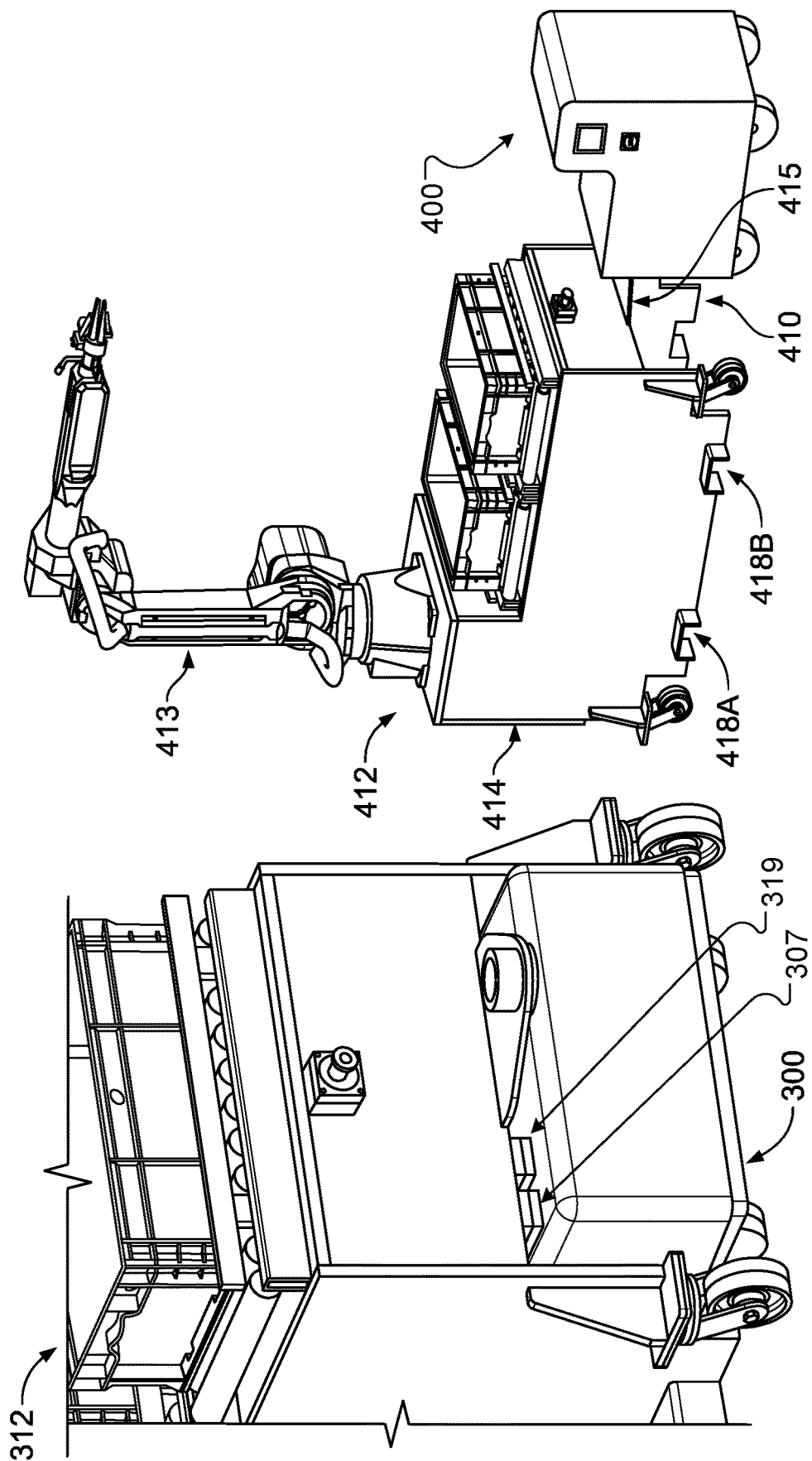

US 11,267,653 B2

MODULAR MULTIFUNCTIONAL WORKCELLS FOR AUTONOMOUS GUIDED VEHICLE APPLICATIONS

BACKGROUND

Autonomous guided vehicles (AGVs) are mobile robots that are often guided using markers on a floor, lasers, visions cameras or other mechanisms to navigate an area. Common uses of AGVs are to carry loads within a facility, such as a warehouse or industrial facility.

SUMMARY

This specification describes technologies relating to AGVs with electro-mechanical interfaces for transporting and charging various different types of workcells, and techniques for scheduling and controlling the AGVs and workcells.

In general, one innovative aspect of the subject matter described in this specification can be embodied in a method that includes identifying a set of tasks to be performed by a set of workcells. Each workcell is adapted to perform one or more particular tasks and at least one workcell performs a different task than each other workcell. For each task, a workcell is selected to perform the task based at least on the one or more particular tasks that each workcell is adapted to perform. For each task, a selection is made, from a set of autonomous guided vehicles (AGVs), an AGV to transport the selected workcell to a location at which the task is to be performed, wherein each AGV includes an electro-mechanical interface that is adapted to (i) connect to or lift multiple different types of workcells and (ii) provide charging power to or receive charging power from multiple different types of workcells. The selected AGV is caused to transport the selected workcell to the location at which the task is to be performed and provide charging power to or receive charging power from the selected workcell. Other implementations of this aspect include corresponding apparatus, systems, and computer programs, configured to perform the aspects of the methods, encoded on computer storage devices.

These and other implementations can each optionally include one or more of the following features. In some aspects, each workcell includes a base having fork receiving areas for receiving forks of forklift AGVs, a tow hitch for receiving a tow pin of a tugger AGV, and a lift area for receiving a lifter AGV under the workcell. One or more fork receiving areas, the tow hitch, and the lift area can include one or more connector pads that are electrically connected to one or more batteries of the workcell. Each connector pad can be configured to contact a corresponding connector pad of each AGV when the AGV is transporting the workcell.

Some aspects can include determining a schedule that defines when each selected AGV will transport the selected workcell for each task based on (i) a location at which each workcell will be placed and (ii) physical limitations of navigating each AGV to the locations at which the tasks are to be performed.

Some aspects include determining, for a particular AGV, whether to provide charging power to or receive charging power from a particular workcell that the particular AGV is transporting based on one or more of (i) a battery charge level of the AGV, (ii) a battery charge level of the particular workcell, or (iii) whether the particular workcell will receive power from another source at a location that the particular AGV will leave the workcell.

Some aspects includes, for a particular task determining whether the selected workcell for the particular task can be left at the location at which the particular task is to be performed, determining whether the selected workcell for the particular task has sufficient battery charge to complete the task, and in response to determining that the selected workcell can be left at the location at which the particular task is to be performed, but that the selected workcell for the particular task does not have sufficient battery charge to complete the task, causing the selected AGV for the particular task to continue charging the selected workcell for the particular task while the task is being performed.

In some aspects, each AGV is configured to communicate with each workcell. Each AGV can be configured to provide safety information to the workcell being transported by the AGV, wherein the safety information comprises instructions that cause moving parts of the workcell being transported by the AGV to remain stationary while the AGV is moving. In some aspects, the set of workcells includes at least one of a robot arm, a robot, a conveyor, or an inspection workcell.

In general, another aspect of the subject matter described in this specification can be embodied in systems that include a first fleet of AGVs that each include electro-mechanical interface that is adapted to (i) connect to or lift multiple different types of workcells and (ii) provide charging power to or receive charging power from multiple different types of workcells; a second fleet of multiple different types of workcells that are each adapted to perform one or more particular tasks, wherein at least one workcell in the second fleet performs a different task than each other workcell in the second fleet; and a control system configured to: a set of tasks to be performed by the second fleet of workcells; for each task: select a workcell to perform the task based at least on the one or more particular tasks that each workcell is adapted to perform; select an AGV to transport the selected workcell to a location at which the task is to be performed; and provide, to the selected AGV, instructions that cause the selected AGV to transport the selected workcell to the location at which the task is to be performed and provide charging power to or receive charging power from the selected workcell through the electro-mechanical interface. Other implementations of this aspect include corresponding methods, apparatus, and computer programs, configured to perform the actions of the methods, encoded on computer storage devices.

These and other implementations can each optionally include one or more of the following features. In some aspects, each workcell includes a base having fork receiving areas for receiving forks of forklift AGVs, a tow hitch for receiving a tow pin of a tugger AGV, and a lift area for receiving a lifter AGV under the workcell.

In some aspects, one or more fork receiving areas, the tow hitch, and the lift area each include one or more connector pads that are electrically connected to one or more batteries of the workcell. Each connector pad can be configured to contact a corresponding connector pad of each AGV when the AGV is transporting the workcell.

In some aspects, the controller is configured to determine a schedule that defines when each selected AGV will transport the selected workcell for each task based on (i) a location at which each workcell will be placed and (ii) physical limitations of navigating each AGV to the locations at which the tasks are to be performed.

In some aspects, the controller is configured to determine, for a particular AGV, whether to provide charging power to or receive charging power from a particular workcell that the particular AGV is transporting based on one or more of (i)

a battery charge level of the AGV, (ii) a battery charge level of the particular workcell, or (iii) whether the particular workcell will receive power from another source at a location that the particular AGV will leave the workcell.

In some aspects, the controller is configured to, for a particular task, determine whether the selected workcell for the particular task can be left at the location at which the particular task is to be performed, determine whether the selected workcell for the particular task has sufficient battery charge to complete the task, and in response to determining that the selected workcell can be left at the location at which the particular task is to be performed, but that the selected workcell for the particular task does not have sufficient battery charge to complete the task, causing the selected AGV for the particular task to continue charging the selected workcell for the particular task while the task is being performed.

In some aspects, each AGV is configured to communicate with each workcell. Each AGV can be configured to provide safety information to the workcell being transported by the AGV. The safety information can include instructions that cause moving parts of the workcell being transported by the AGV to remain stationary while the AGV is moving. In some aspects, the second fleet of workcells includes at least one of a robot arm, a robot, a conveyor, or an inspection workcell.

The subject matter described in this specification can be implemented in particular embodiments so as to realize one or more of the following advantages. Using AGVs that can transport and drop off various types of workcells (e.g., robot arms, part inspectors, conveyors for material transfer, and/or computer equipment) rather than being attached to a single workcell provides better flexibility in moving workcells and scheduling tasks to be performed by the workcells. This also reduces costs and storage space associated with having special purpose AGVs for each type of workcell. This flexibility is especially useful in data center applications in which many different workcells are required to perform tasks and space is limited for storing and navigating AGVs about the data center. A facility controller can schedule AGVs based on the location of workcells and other AGVs so that the limited paths to navigate the AGVs are not obstructed, thereby preventing delays caused by such obstructions.

AGVs that include electro-mechanical interfaces enables the AGVs to charge battery-powered workcells during transport and/or while the workcells are performing their tasks. This provides additional flexibility in situations in which the workcells will not be located near a power source when performing its task. In addition, the interfaces can enable the workcells to charge battery-powered AGVs, which enables workcells that are fully charged to keep the AGVs moving in situations in which the schedule of transporting workcells do not allow for the AGVs to stop and charge. This reduces downtime of the AGVs and increases the amount of transporting and other work performed by the AGVs.

Various features and advantages of the foregoing subject matter is described below with respect to the figures. Additional features and advantages are apparent from the subject matter described herein and the claims.

BRIEF DESCRIPTION OF THE DRAWINGS

FIG. 3B is a diagram illustrating an example lifter AGV lifting a workcell and engaging connector pads of a workcell.

FIG. 4A is a diagram illustrating an example tugger AGV transporting a robot arm workcell.

Like reference numbers and designations in the various drawings indicate like elements.

DETAILED DESCRIPTION

In general, this document describes technologies relating to AGVs with electro-mechanical interfaces for transporting and charging various different types of workcells, and techniques for scheduling and controlling the AGVs and workcells. Each workcell can be configured to perform one or more tasks. For example, one workcell can include a robot arm for moving products, attaching parts to a product, or swapping computer equipment and another workcell can include a part inspection system that inspects parts. As the location of the tasks can vary, the AGVs can be controlled to transport the workcells to the location of the tasks that the workcell with perform.

Each AGV can be configured to transport various types of workcells, such as robot arms, part inspection or scanning workcells, computer workcells, product labelers, package sorters, conveyors for material transfer, and/or other types of workcells that perform tasks on other items or pieces of equipment. For example, each AGV can include an electro-mechanical interface that attaches to or lifts various types of workcells. The electro-mechanical interface can also include electrical connector pads that contact connector pads of the various types of workcells so that the batteries of the AGV can charge the batteries of the workcells during transport and/or receive a charge from the batteries of the workcells. The connector pads of the electro-mechanical interface can be arranged such that the connector pads contact the connector pads of the workcells when the workcells are attached to or supported by the AGV.

Each workcell can be configured to be transported by multiple different types of AGVs. For example, a workcell can include fork receiving areas for receiving forks of a forklift AGV, a hitch receiver for receiving a tow pin of a tugger AGV, and a lift area underneath the workcell for receiving a lift AGV. Each of these areas can include connector pads that contact corresponding connector pads of the AGVs for charging the workcells or AGVs.

Figure 1:
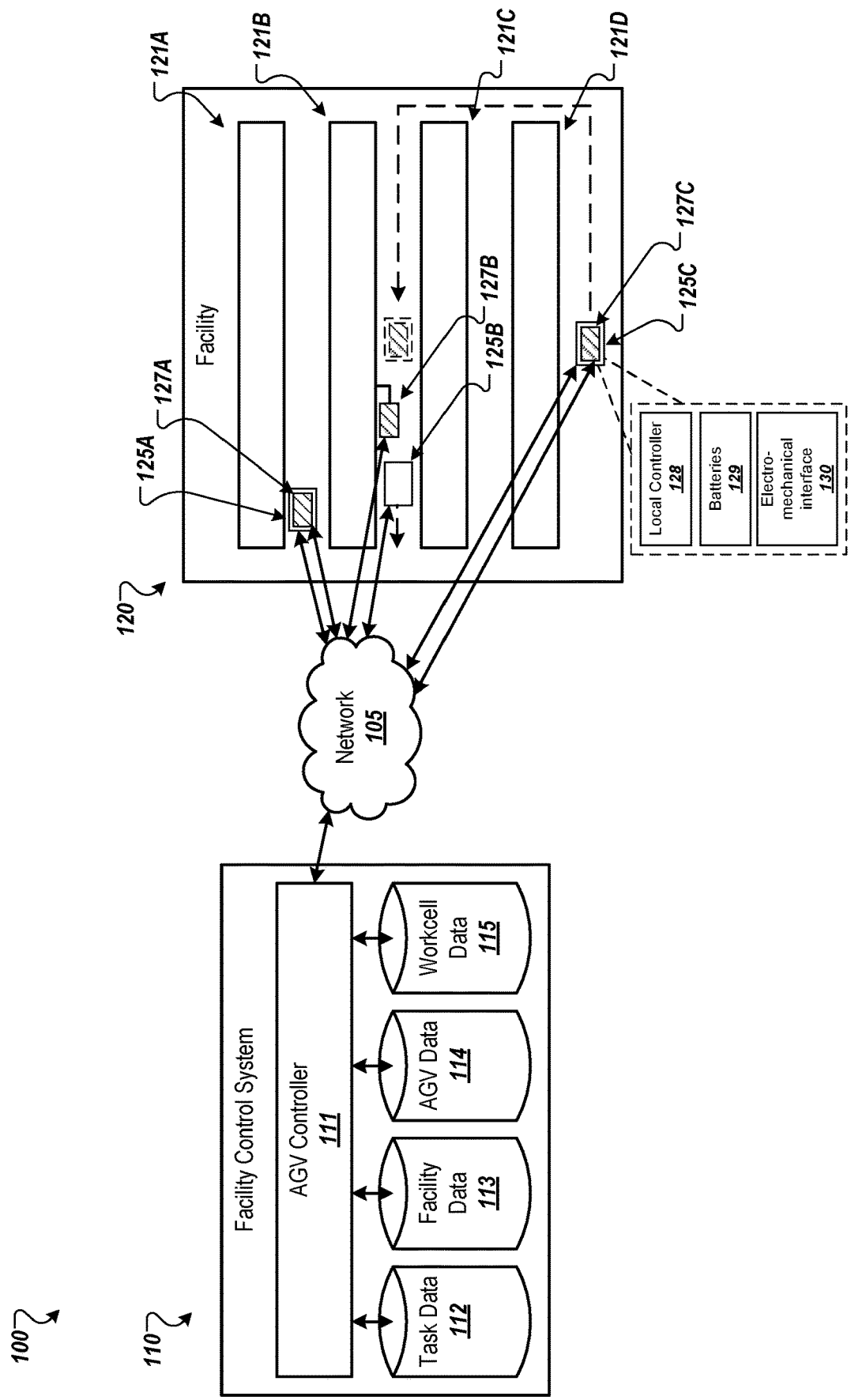
FIG. 1 is a block diagram of an environment in which an example facility control system controls AGVs to transport workcells about a facility.

FIG. 1 is a block diagram of an environment 100 in which an example facility control system 110 controls AGVs 125 (e.g., AGV 125A and AGV 125B) to transport workcells about a facility 120. The facility can be an indoor facility (e.g., a data center, warehouse, distribution center, industrial facility) or an outdoor facility (e.g., a farm, event center, etc.). In this example, the facility 120 is a data center with rows of computer racks 121A-121D that hold computing equipment.

The facility 120 includes a fleet of multiple different types of workcells 127 and a fleet of multiple different types of AGVs 125 configured to transport the workcells 127 about the facility 120. The workcells 127 can include workcells 127 that perform different tasks. For example, one workcell can be a robot arm workcell that includes a robot arm that is configured to swap out computer parts and another workcell can include a test system that tests computer components. As described below, each workcell 127 can be configured to be transported by multiple different types of AGVs, including tugger AGVs, lifter AGVs, and forklift AGVs.

Each AGV 125 includes, among other things as further described below, a local controller 128, one or more batteries 129, and an electro-mechanical interface 130. The local controller 128 can navigate the AGV 125 about the facility 120 based on instructions received from the AGV controller 111. The local controller 128 can also navigate the AGV 125 to approach and attach to, or lift, a workcell 127.

The batteries 129 are used to power the AGV 125 including propelling the AGV 125. The batteries 129 are also used to charge the batteries of workcells 127, e.g., during transport of the workcells 127 and/or while the workcells 127 are performing tasks. In some implementations, the batteries 129 are rechargeable batteries that can be charged by the batteries of the workcells 127, e.g., during transport of the workcells 127 and/or while the workcells 127 are performing tasks. In addition, the AGVs 125 can include connector pads that can connect to an external charging source. In this way, the AGVs 125 can recharge their batteries 129 at external charging sources at or near the location where a workcell 127 transported by the AGV 125 is performing a task. For example, a data center or other facility can include charging stations for AGVs 125 near the racks or other areas at which workcells 127 perform tasks.

The electro-mechanical interface 130 can include a mechanical device for attaching to or supporting a workcell 127. For example, the electro-mechanical interface 130 can include forks of a forklift AGV, a tow pin (or hook or ball) of a tugger AGV, or a lift platform of a lifter AGC. The electro-mechanical interface 130 can also include connector pads on the mechanical device. The connector pads of the AGV 125 can connect to connector pads of the workcells 127. The connector pads of the AGV 125 can also connect to the batteries 129 and the connector pads of the workcells 127 can connect to the batteries of the workcells 127. In this way, the batteries 129 of the AGV 125 can charge the batteries of a workcell 127 through the connector pads and/or the batteries of the workcell 127 can charge the batteries of the AGV 125 through the connector pads.

The local controller 128 can determine whether to use the batteries 129 of an AGV 125 to charge the batteries of a workcell 127 being transported by the AGV 125 or whether to use the batteries of the workcell 127 to charge the batteries of the AGV 125. For example, the local controller 128 or the AGV controller 111 can make the determination based on the charge level of the batteries 129 of the AGV 125, the charge level of the batteries of the workcell 127, whether the workcell 127 will receive power from another source at a location that the AGV 125 will leave the workcell 127 (e.g., where the workcell 127 performs a task), and an estimated duration required for the workcell 127 to perform its task.

In a particular example, if the workcell 127 does not have sufficient charge to complete its task (e.g., the charge level of the battery indicates an estimated duration that is less than the duration for completing the task), the local controller 128 can determine to charge the batteries of the workcell 127 during transport. If the batteries of the workcell 127 still does not have sufficient charge to complete the task and there is no power source at the task location, the local controller 128 (or the AGV controller 111) can determine that the AGV 125 will stay with the workcell 127 and continue charging the batteries of the workcell 127 until the batteries have sufficient charge to complete the task. Depending on the type of workcell 127, the workcell 127 may be able to perform the task while being attached to or supported by the AGV 125 and being charged by the batteries of the AGV 125.

In another example, if the batteries of the workcell 127 have sufficient charge to complete the task and/or the workcell 127 can plug itself into a power source at the task location, the local controller 128 (or the AGV controller 111) can determine that the batteries of the workcell 127 will charge the batteries of the AGV 125 during transport. This determination can also be based on whether the batteries of the workcell 127 can charge the batteries 129 of the AGV 125 and still have sufficient charge to complete the task after charging the batteries of the AGV 125 during transport. In another example, the local controller 128 (or the AGV controller 111) can stop charging the batteries 129 of the AGV 125 if the charge level of the battery drops below a threshold that is based on the amount of charge required for the workcell 127 to complete the task.

The local controller 128 can also take into account additional tasks of the workcell 127 and whether the batteries of the workcell 127 have sufficient charge to complete the additional tasks when determining which batteries to charge, if any.

The AGV 125 and/or the workcell 127 can include a battery management system that controls its charging state. For example, the AGV 125 can include a battery management system that selectively switches between the batteries being charged, e.g., by a workcell 127 or other external power source, and the batteries charging another battery, e.g., the batteries of a workcell 127. Similarly, the workcell 127 can include a battery management system that selectively switches between the batteries being charged, e.g., by an AGV 125 or other external power source, and the batteries charging another battery, e.g., the batteries of an AGV 125. The local controller 128 can interact with the battery management systems of AGVs 125 and work cells 127 to control which device (e.g., an AGV or a workcell) charges the other.

The AGVs 125 can be configured to communicate with the workcells, e.g., through the electro-mechanical interface or through another means, such as a direct wireless connection. This enables the AGVs 125 to request the charge level of the batteries of the workcell being transported and/or to control the workcell 127. For example, the AGVs 125 can include safety controls for maintaining a safe transport of the workcells 127. In a particular example, the AGVs 125 can control the workcells 127 to not move any moving parts (e.g., robot arms) while the AGV 125 is moving to avoid hitting any obstacles or tipping over the AGV 125.

The facility control system 110, which can be implemented as one or more computers, includes an AGV controller 111 that controls the AGVs 125 by sending instructions over a wireless network 105, such as a Wi-Fi network. The AGV controller 111 can instruct AGVs 125 to transport workcells 127 about the facility 120 so that the workcells can perform tasks. For example, the AGV controller 111 can send to an AGV 120 instructions that specify a particular workcell (e.g., an identifier for the workcell) and a destination location for the particular workcell. The instructions can also the current location of the particular workcell, a route between the current location and the destination location, and/or data related to the task (e.g., whether the AGV will remain with the workcell during the task, the estimated duration of the task, or whether the AGV will need to charge the workcell during transport and/or during performance of the task). In a data center, these tasks can include, for example, automated repairs of computing equipment, rack deployment, automated decommissioning of computing equipment, heavy equipment assistance, staging and supplying equipment, and/or picking and placing parts in a coordinated effort with humans or other robots to complete tasks.

The AGV controller 111 can schedule the workcells and AGVs based on task data 112, facility data 113, AGV data 114, and/or workcell data 115. The task data 113 defines tasks that are to be performed by the workcells 127. For example, a user or an automated system can specify a set of tasks to be completed by the workcells 127, e.g., for a given time period such as a given day. For each task, the task data 112 can specify a workcell 127 or type of workcell 127 that is capable of performing the task. In other examples, the AGV control 111 or another controller can select the workcell 127 for each task.

The facility data 113 includes data related to the facility 120. This facility data can include the layout of the facility 120 including any areas where AGVs 125 are allowed to enter and any areas where AGVs are not allowed to enter. The facility data 112 can also include data specifying the location of structures (e.g., the racks 121A-121D) and other obstacles, the space between the structures and obstacles between which AGVs 125 can navigate, and the location of various items witch which tasks can be performed (e.g., the location of each particular piece of computing equipment).

The AGV data 114 can include data for each AGV 125 of the facility 120. This data can include, for each AGV 125, a unique identifier of the AGV 125, a type of the AGV 125 (e.g., lifter, tugger, forklift, or other type of AGV), the load capacity of the AGV 125, and/or data specifying workcells that can and/or cannot be transported by the AGV 125 (e.g., unique identifiers of the workcells or the types of the workcells). For example, the AGV data 114 for a tugger AGV can specify that the AGV is a tugger AGV that can transport workcells with a weight up to 3,000 pounds. The AGV data 114 can also include data specifying the current location of each AGV 125 and/or a current status of the AGV 125 (e.g., transporting a workcell 127, waiting for a workcell 127 attached to or supported by the AGV 125 to complete a task, performing another task, e.g., moving products independent of any workcell 127, or idle.

The workcell data 115 can include data for each workcell 127 of the facility 120. This data can include, for each workcell 127, a unique identifier of the workcell 127, a type of the workcell 127 (e.g., robot arm, part inspector, etc.), one or more tasks capable of being performed by the workcell 127, a size and weight of the workcell 127, and/or data specifying AGVs that can transport the workcell 127 (e.g., unique identifiers of the AGVs or the types of the AGVs). The workcell data 115 can also include data specifying the current location of each workcell 117, the current battery level of the workcell 127, what task the workcell 127 is currently performing (if any), and/or the duration of time remaining the complete the task.

The AGV controller 111 can use the various data to schedule tasks, select workcells 127 to perform the tasks, and select AGVs 125 to transport each selected workcell 127. The AGV controller 111 can schedule the tasks based on priority, the availability of the workcells 127 and AGVs 125, and the status of the workcells 127 and AGVs 125 (e.g., based on the charge level of their batteries).

The AGV controller 111 can select a workcell 127 for a task based on the tasks that each workcell 127 performs. For example, the AGV controller 111 can filter the workcells 127 down to those that are capable of performing the task. The AGV controller 111 can also select the workcell 127 for the task based on the availability of the workcells that are capable of performing the task, the location of the available and capable workcells, whether other workcells or other obstacles obstruct a path between the workcell and the location where the task is to be performed, the charge level of the batteries of the available workcells, and/or other appropriate factors.

The AGV controller 111 can select an AGV to transport the selected workcell based on whether the AGVs are capable of transporting the selected workcell, the availability of the capable AGVs, the location of the capable AGVs relative to the location of the selected workcell, the charge level of the capable AGVs, and/or other appropriate factors.

The AGV controller 111 can select and schedule workcells 127 and AGVs 125 to transport the workcells 127 based on various factors and various objectives. One example objective is to complete the largest number or highest percentage of tasks that need to be performed. In this example, the AGV controller 111 can select and schedule the workcells 127 and AGVs 125 based the number of workcells 127 that can perform the tasks, the number of AGVs 125 that can transport the workcells 127, and the battery level of each workcell 127 and AGV 125. For example, the AGV controller 111 can optimize the scheduling such that the most amount of work (e.g., the largest number of tasks) are completed per unit charge of the batteries of the workcells 127 and AGVs 125.

Figures 2A, 2B:
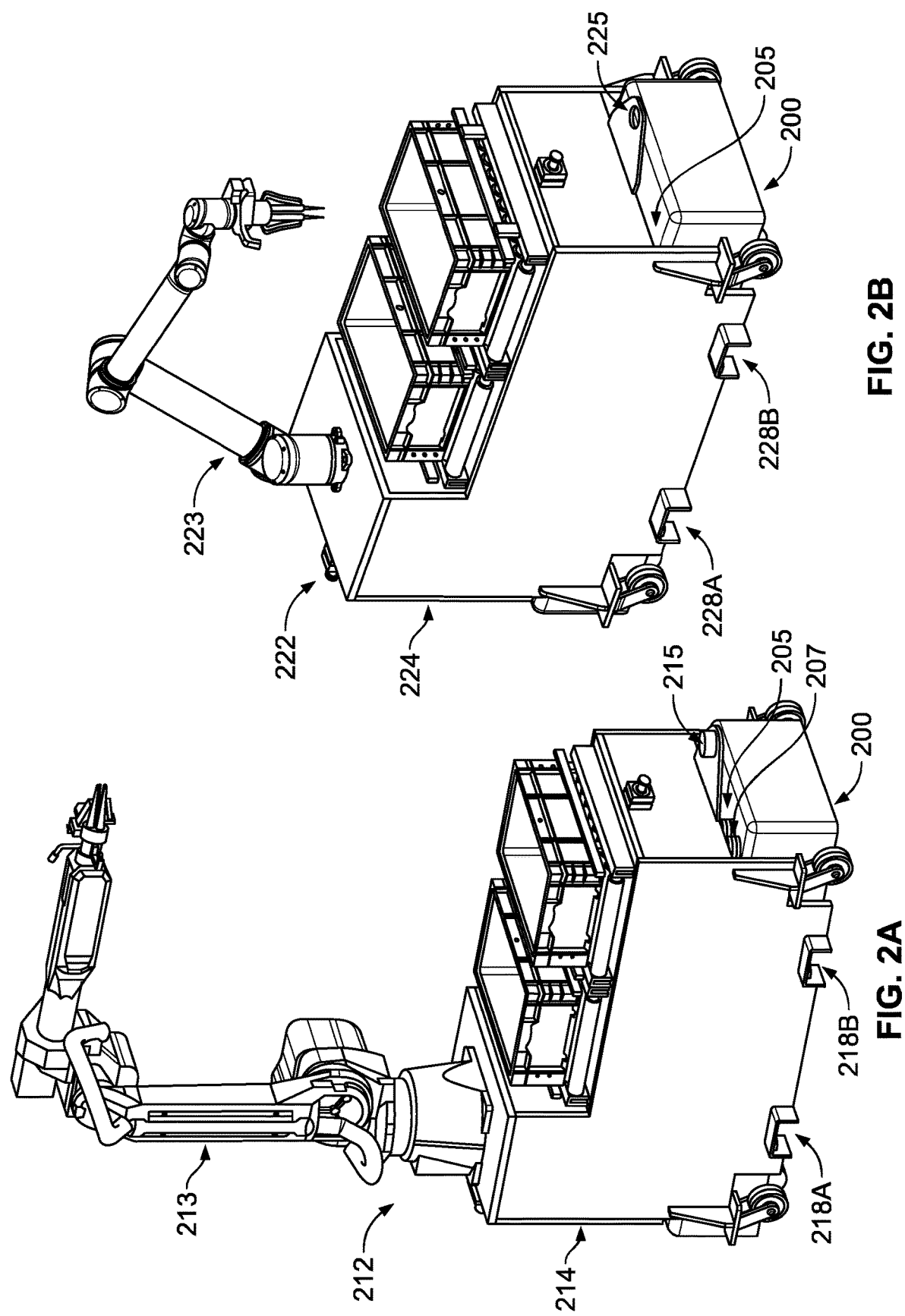
FIG. 2A is a diagram illustrating an example lifter AGV transporting a robot arm workcell.
FIG. 2B is a diagram illustrating an example lifter AGV transporting another robot arm workcell.
Figure 2C:
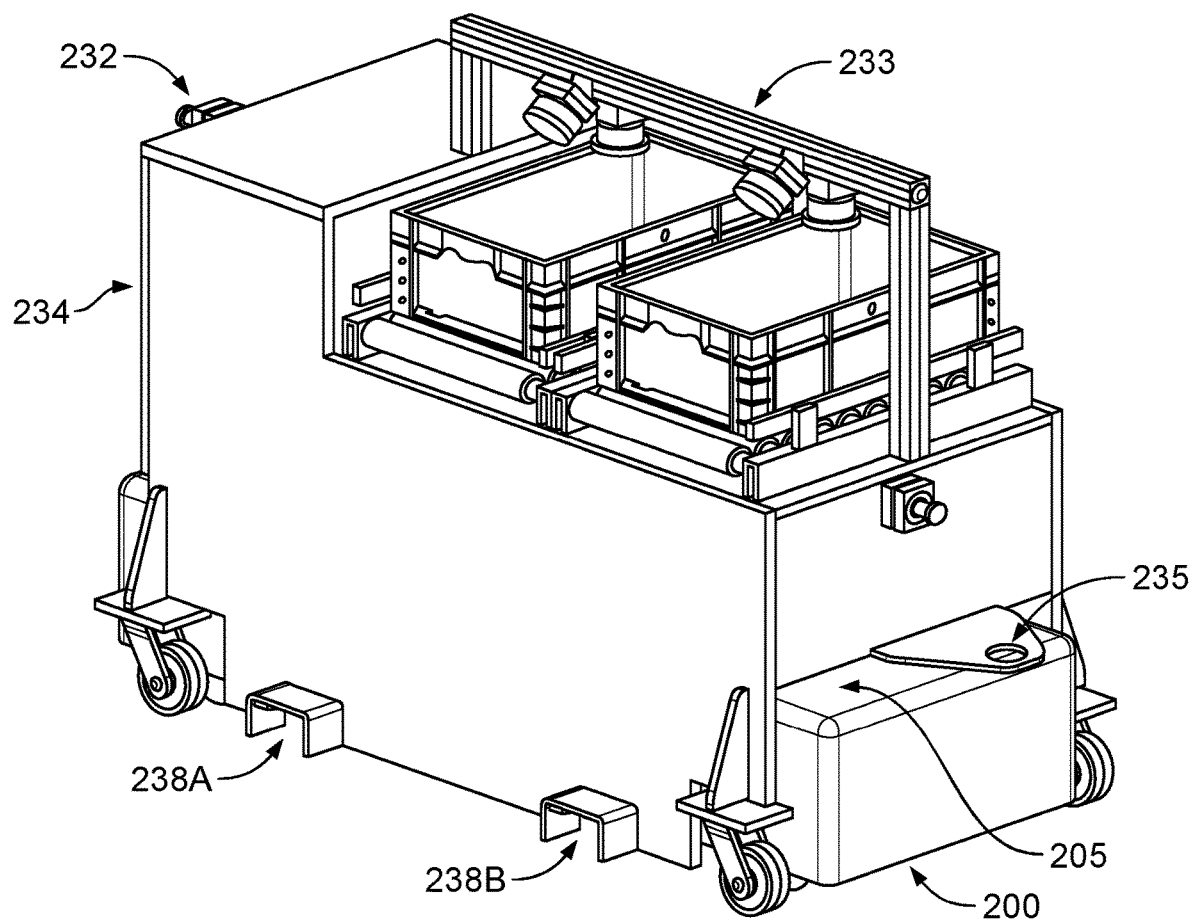
FIG. 2C is a diagram illustrating an example lifter AGV transporting a part scanning or inspection workcell.

FIGS. 2A-2C are diagrams illustrating an example lifter AGV 200 transporting various workcells. In particular, FIG. 2A illustrates the example lifter AGV 200 transporting a robot arm workcell 212; FIG. 2B illustrates the example lifter AGV 200 transporting another robot arm workcell 222; and FIG. 2C illustrates the example lifter AGV 200 transporting a part scanning or inspection workcell 232.

The lifter AGV 200 includes a lift platform 205 that can be lifted to lift the workcells 212, 222, and 232 off the ground and to transport the workcells 212, 222, and 232 about a facility. To lift a workcell, the lifter AGV 200 can navigate underneath the workcell between the wheels of the workcell. The lifter AGV 200 can then cause the lift platform 209 to raise and lift the workcell off the ground. The lifter AGV 200 can then carry the workcell to its destination, e.g., at a task location where the workcell will perform a task.

Figure 3A:
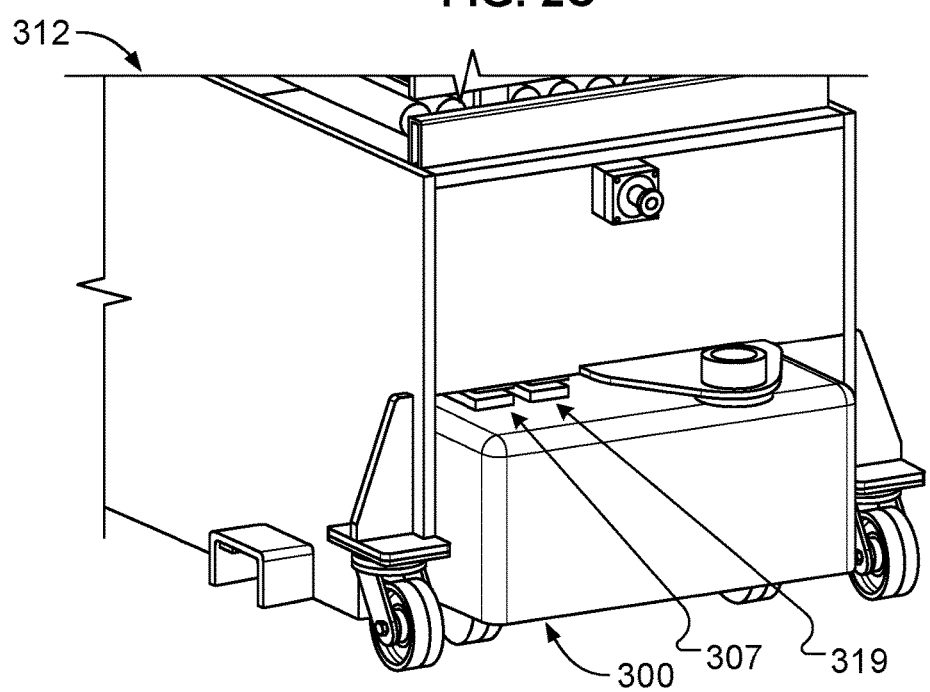
FIG. 3A is a diagram illustrating an example lifter AGV approaching a workcell.

The lifter AGV 200 also includes connector pads 207 on the lift platform 205. The connector pads 207 can be located on the lift platform 205 such that when the lift platform 205 is lifted the connector pads 207 contact corresponding connector pads of the workcells 212, 222, and 232. The connector pads 207 can be connected to the batteries of the lifter AGV 200 so that the AGV 200 can charge the batteries of the workcell (or be charged by the batteries of the workcell) through the connector pads 207 and the corresponding connector pads of the workcell. Example connector pads are illustrated in FIGS. 3A and 3B and described below.

The lifter AGV 200 can be configured to carry various workcells having up to a maximum size and weight. Thus, if there are different types of workcells that are larger or that weigh more than the capacity of the lifter AGV 200, other lifter AGVs or other types of AGVs (e.g., tugger or forklift AGVs) can be used for those workcells.

Figure 4B:
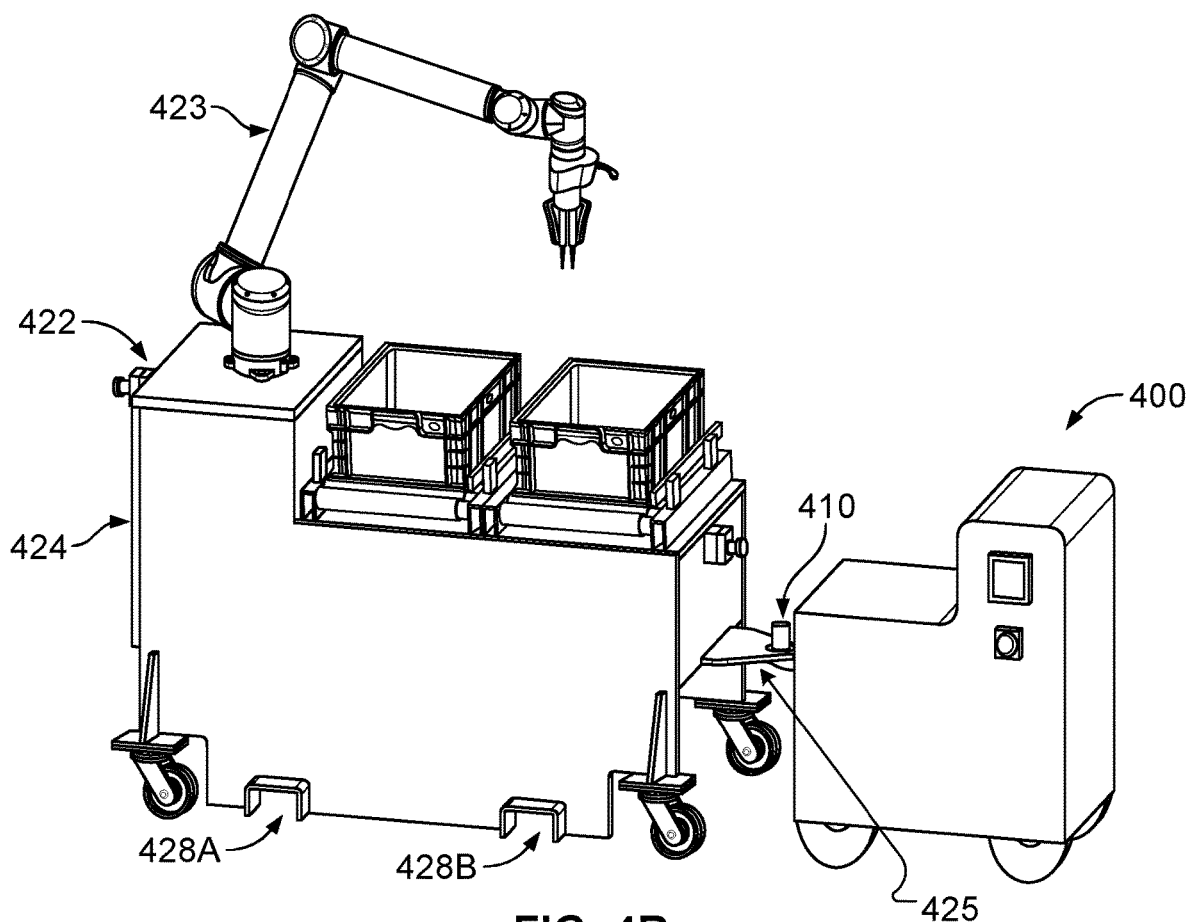
FIG. 4B is a diagram illustrating an example tugger AGV transporting another robot arm workcell.
Figure 4C:
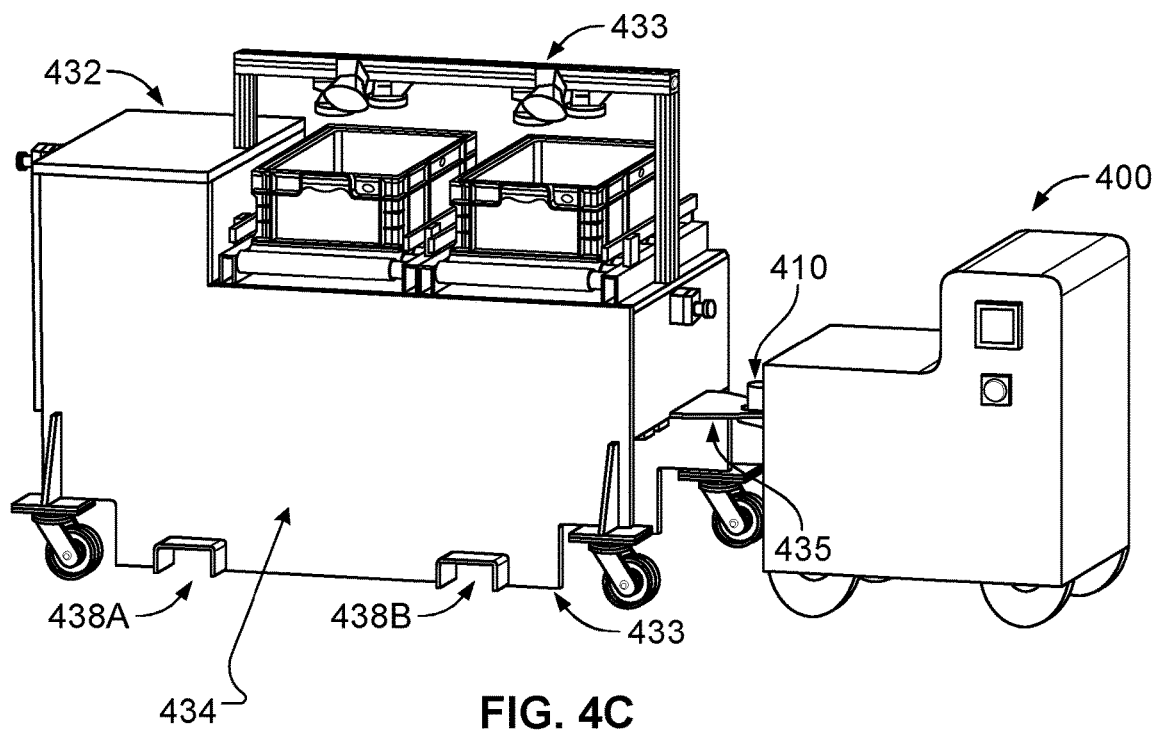
FIG. 4C is a diagram illustrating an example tugger AGV transporting a part scanning or inspection workcell.
Figure 6A:
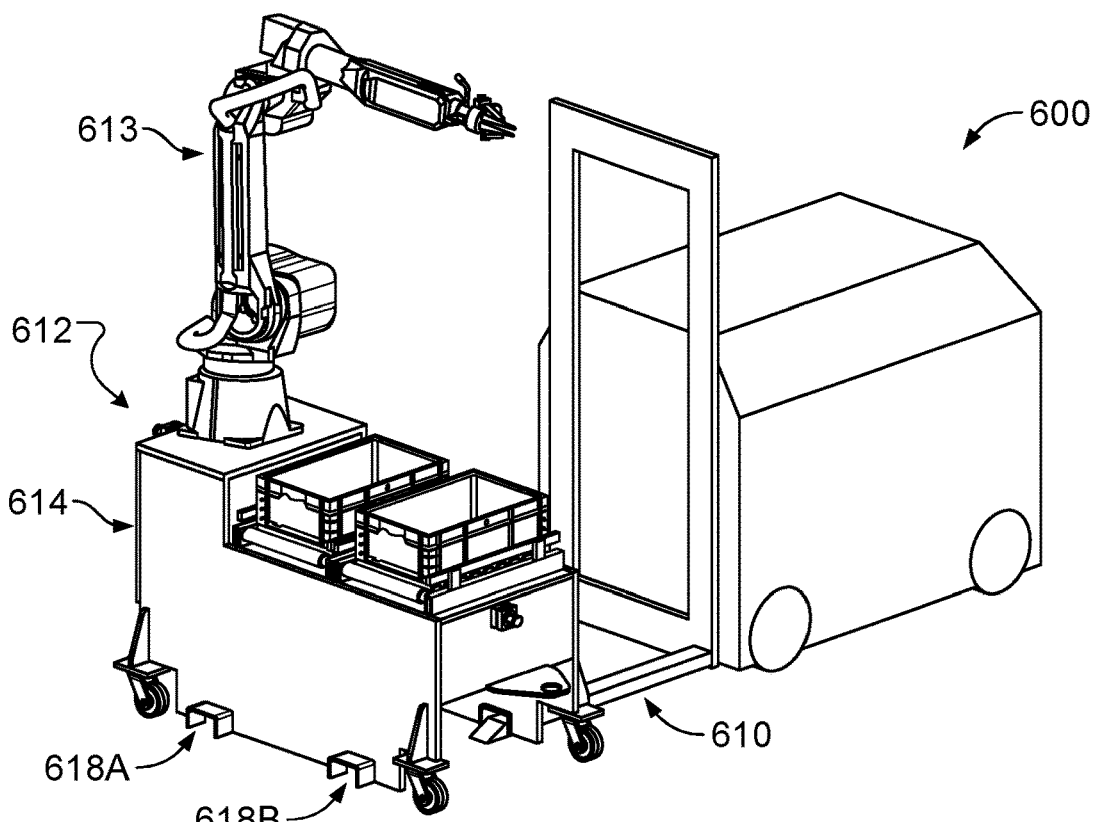
FIG. 6A is a diagram illustrating an example forklift AGV transporting a robot arm workcell.
Figure 6B:
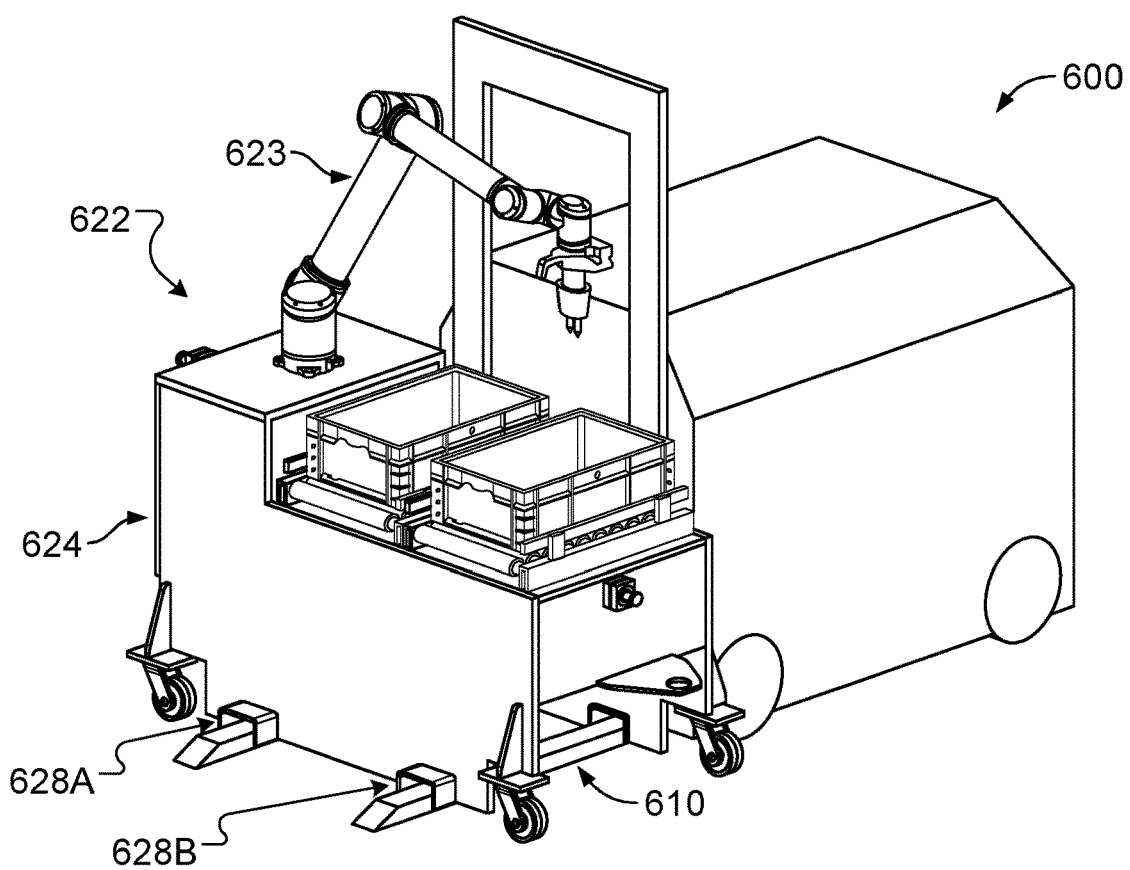
FIG. 6B is a diagram illustrating an example forklift AGV transporting another robot arm workcell.

Each workcell 212, 222, and 232 is configured to be transported by multiple different types of AGVs. For example, the workcell 212 includes a robot arm 213 and a base 214 to which the robot arm 213 is attached and that supports the robot arm 213. The base 214 includes a lift area underneath and between its wheels for receiving a lifter AGV 200. In some implementations, the base 214 may not include wheels. In such examples, the lift area can be between other support members that hold the workcell 212 above ground, e.g., legs, posts, or other types of support members. In either example, the supports define a lift area between them and under the workcell 212 for a lifter AGV go under and lift the workcell 212. The base 214 also includes a hitch receiver 215 for receiving a tow pin (or tow ball or hook) of a tugger AGV, as shown in FIGS. 4A-4C and described below. The base 214 also includes fork receiving areas 218A and 218 for receiving forks of forklift AGVs, as shown in FIGS. 6A-6B and described below.

The workcell 222 also includes a robot arm 223 which is a different type of robot arm and may have a different weight and the ability to perform different tasks than the robot arm 213. For example, the robot arm 213 may be capable of lifting and moving heavier objects (e.g., up to 28 kilogram objects) than the robot arm 223 (e.g., up to 10 kilogram objects). The workcell 222 also includes a base 224 that has an area underneath for receiving a lifter AGV 200, a hitch receiver 225 for receiving a tow pin (or tow ball or hook) of a tugger AGV, and fork receiving areas 228A and 228 for receiving forks of forklift AGVs. Similarly, the workcell 232 includes a part scanning or inspection system 233, a base 234 that has an area underneath for receiving a lifter AGV 200, a hitch receiver 235 for receiving a tow pin (or tow ball or hook) of a tugger AGV, and fork receiving areas 238A and 238B for receiving forks of forklift AGVs.

The flexibility of the workcells 212, 222, and 232 enables the facility controller 111 of FIG. 1 more flexibility in selecting AGVs to transport various workcells in a facility and to better optimize the scheduling and route planning. This also enables the facility to potentially use fewer AGVs, thereby reducing costs and storage requirements.

FIG. 3A is a diagram illustrating an example lifter AGV 300 approaching a workcell 312. FIG. 3B is a diagram illustrating the lifter AGV 300 lifting the workcell 312 and engaging connector pads 319 of the workcell 312. The lifter AGV 300 can be similar to, or the same as, the lifter AGV 200 of FIGS. 2A-2C. Similarly, the workcell 312 can be the same as, or similar to, either workcell 212, 222, or 232 of FIGS. 2A-2C.

The lifter AGV 300 includes connector pads 307 that are made of a conductive material and that are connected to the batteries of the lifter AGV 300. The connector pads 307 can include two pads, a positive pad and a negative pad. Similarly, the workcell 312 includes connector pads 319, which can include a positive pad and a negative pad.

As shown in FIG. 3A, the connector pads 307 and 319 are arranged in the same area so that the connector pads 307 and 319 come contact each other when the workcell 312 is lifted by the lifter AGV 300. When the AGV 300 approaches the workcell 300 and goes underneath the workcell 300, there is space between the connector pads 307 and 319 to allow the lifter AGV 300 to navigate into the proper location under the workcell 312. As shown in FIG. 3B, when the lifter AGV 300 has lifted the workcell 312, the connector pads 307 are in contact with the connector pads 319, enabling the batteries of the AGV 300 to charge the batteries of the workcell 312 and/or the batteries of the workcell 312 to charge the batteries of the AGV 300.

FIGS. 4A-4C are diagrams illustrating an example tugger AGV 400 transporting various workcells. In particular, FIG. 4A illustrates the tugger AGV 400 transporting a robot arm workcell 412; FIG. 4B illustrates the tugger AGV 400 transporting another robot arm workcell 422; and FIG. 4C illustrates the tugger AGV transporting a part scanning or inspection workcell 432.

Figure 5A:
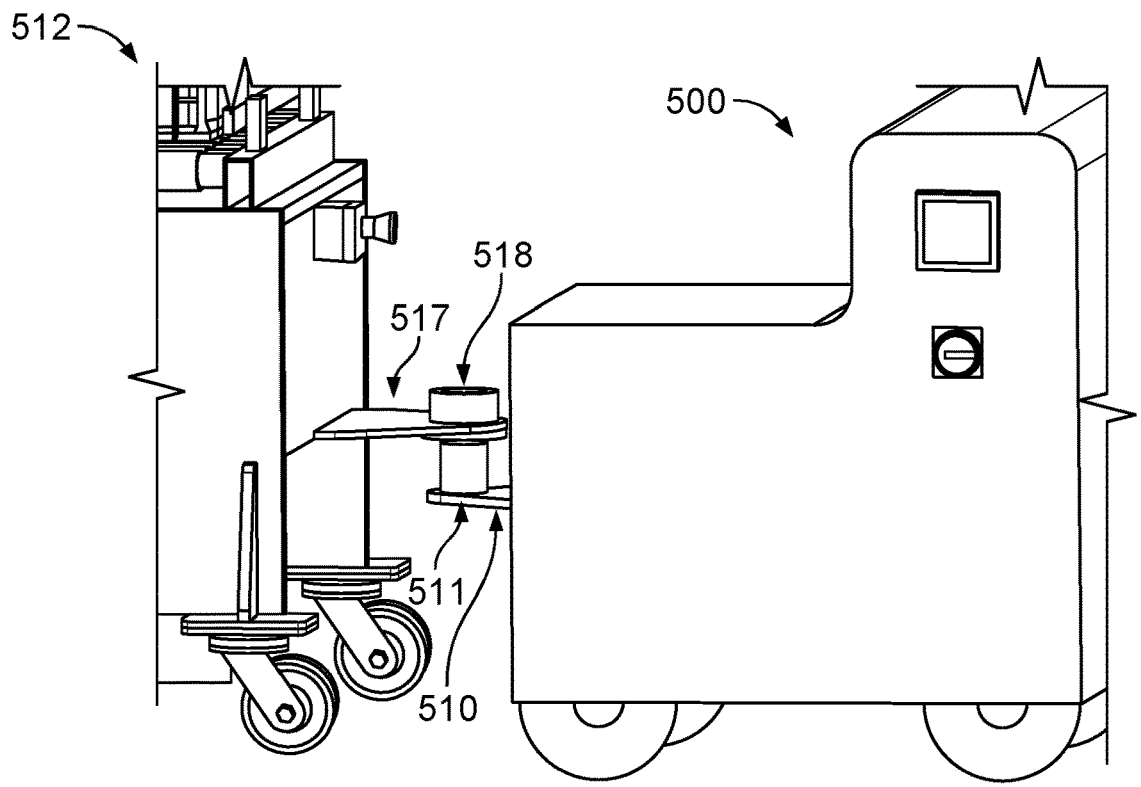
FIG. 5A is a diagram illustrating an example tugger AGV approaching a workcell.
Figure 5B:
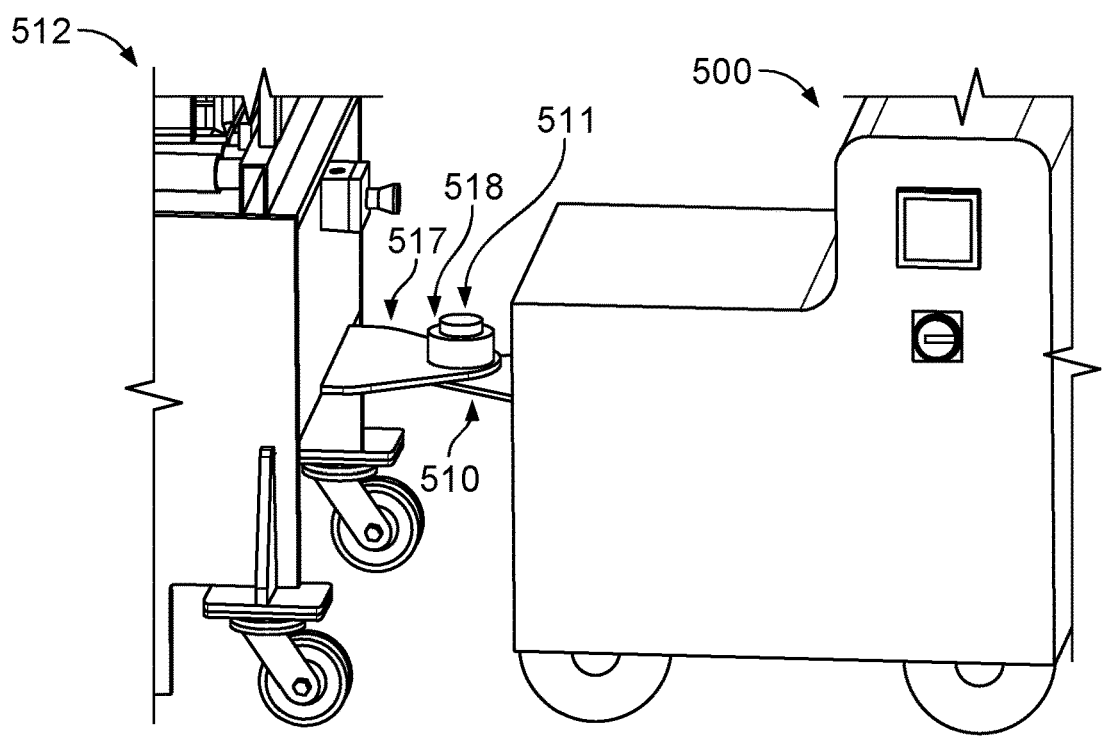
FIG. 5B is a diagram illustrating an example tugger AGV connecting to a workcell and engaging connector pads of the workcell.

The tugger AGV 400 includes a tow pin 410 that is inserted into a hitch receiver 415 of the workcell 412 (or the hitch receiver 425 of the workcell 422 or the hitch receiver 435 of the workcell 432). With the tow pin 410 in a hitch receiver, the AGV 400 can tow the workcell about a facility. As shown in FIGS. 5A and 5B, the tow pin 410 and the hitch receivers 415, 425, and 435 can include connector pads for charging the batteries of the workcells 412, 422, and 432 and/or the batteries of the tugger AGV 400.

The workcells 412, 422, and 432, can be the same as or similar to the workcells 212, 222, and 232 of FIGS. 2A-2C, respectively. For example, the workcell 412 includes a robot arm 413 and a base 414 to which the robot arm 413 is attached and that supports the robot arm 413. The base 414 includes an area underneath and between its wheels for receiving a lifter AGV. The base 414 also includes a hitch receiver 415 for receiving a tow pin (or tow ball or hook) of the tugger AGV 400. The base 414 also includes fork receiving areas 418A and 418 for receiving forks of forklift AGVs, as shown in FIGS. 6A-6B and described below.

The workcell 422 also includes a robot arm 423 which is a different type of robot arm and may have a different weight and the ability to perform different tasks than the robot arm 413. The workcell 422 also includes a base 424 that has an area underneath for receiving a lifter, a hitch receiver 425 for receiving a tow pin (or tow ball or hook) of the tugger AGV 400, and fork receiving areas 428A and 2428 for receiving forks of forklift AGVs. Similarly, the workcell 432 includes a part scanning or inspection system 433, a base 434 that has an area underneath for receiving a lifter AGV, a hitch receiver 435 for receiving a tow pin (or tow ball or hook) of the tugger AGV 400, and fork receiving areas 438A and 438B for receiving forks of forklift AGVs.

FIG. 5A is a diagram illustrating an example tugger AGV 500 approaching a workcell 512. FIG. 5B is a diagram illustrating the tugger AGV 500 connecting to the workcell 512 and engaging connector pads of the workcell 512. The tugger AGV 500 can be similar to, or the same as, the tugger AGV 400 of FIGS. 4A-4C. Similarly, the workcell 512 can be the same as, or similar to, either workcell 412, 422, or 432 of FIGS. 4A-4C.

The tugger AGV 500 includes connector pads 511 on a tow pin 510 that is inserted into connector pads 518 of a hitch receiver 517 of the workcell 512. The electrical connection between the AGV 500 and the tow pin 510 to enable charging can be made using conductive pads, e.g., the connector pads 511 can include a pair of opposite polarity conductive pads (one near the top and one near the bottom) and the connector pads 518 can include a pair of opposite polarity conductive pads that align with the connector pads 511 when the AGV 500 is attached to the workcell 512. In another example, an inductive interface can be used to transfer power wirelessly between the tow pin 510 and the hitch receiver 518 when they are aligned, e.g., when the AGV 500 is connected to the workcell 512. In yet another example, an aligning connector can be used for the electrical connection.

The tugger AGV 500 can lower the tow pin 510 when (or before) approaching the workcell 512. When the tow pin 510 is directly below the aperture of the hitch receiver 517, the tugger AGV 500 can raise the tow pin 510 until the tow pin 510 goes through the aperture of the hitch receiver 517 and the connector pads 511 and 518 make contact. This enables the tugger AGV 500 to pull the workcell 512 and charge the batteries of the workcell 512 during transport. This can also enable the batteries of the workcell 512 to charge the batteries of the tugger AGV 500.

Figure 6C:
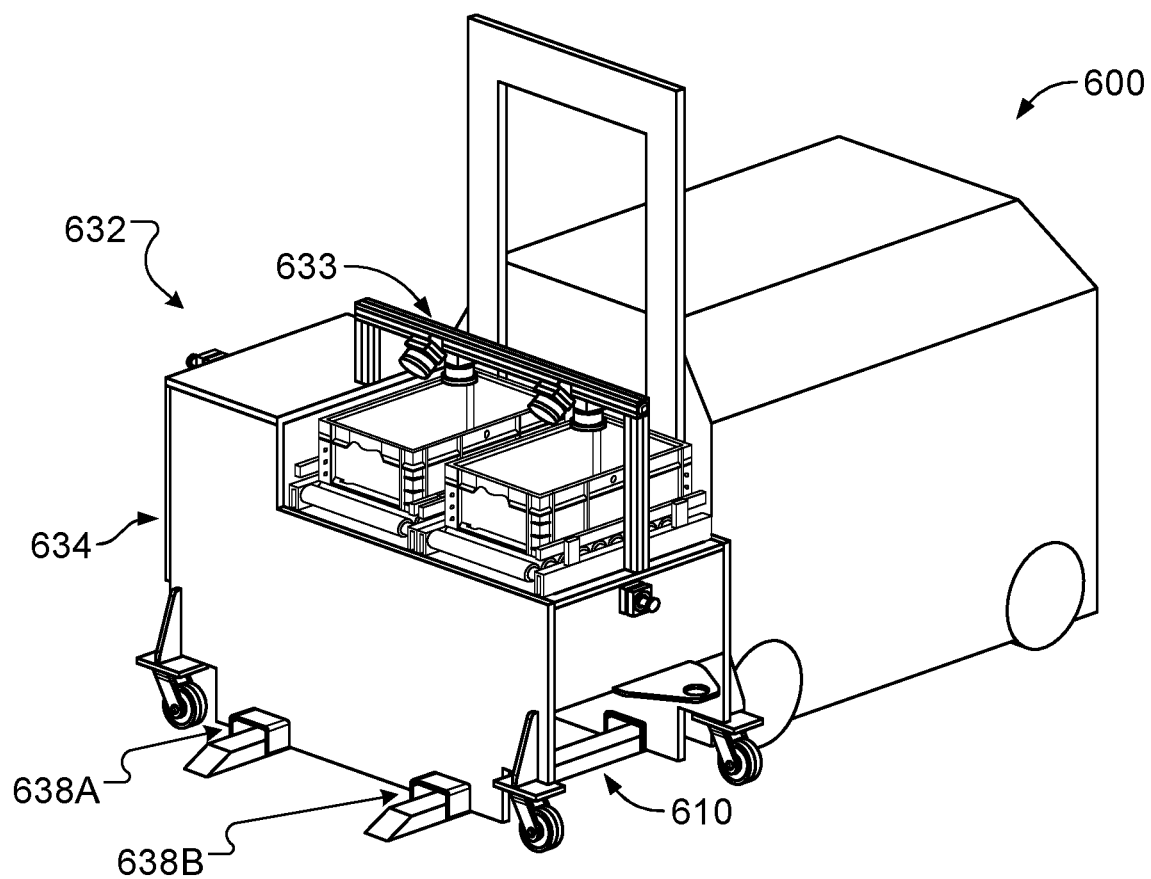
FIG. 6C is a diagram illustrating an example forklift AGV transporting a part scanning or inspection workcell.

FIGS. 6A-6C are diagrams illustrating an example forklift AGV 600 transporting various workcells. In particular, FIG. 6A illustrates the forklift AGV 600 transporting a robot arm workcell 612; FIG. 6B illustrates the forklift AGV 600 transporting another robot arm workcell 622; and FIG. 6C illustrates the forklift AGV 600 transporting a part scanning or inspection workcell 632.

Figure 7A:
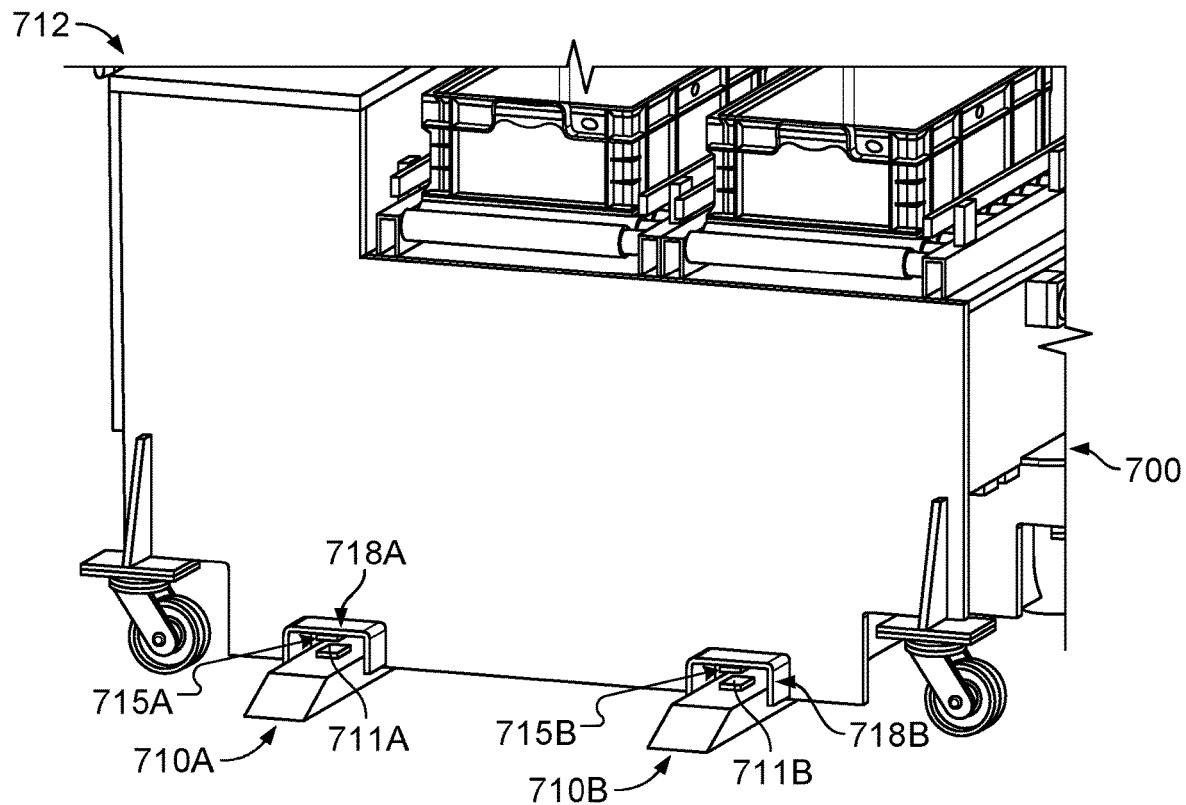
FIG. 7A is a diagram illustrating an example forklift AGV approaching a workcell.
Figure 7B:
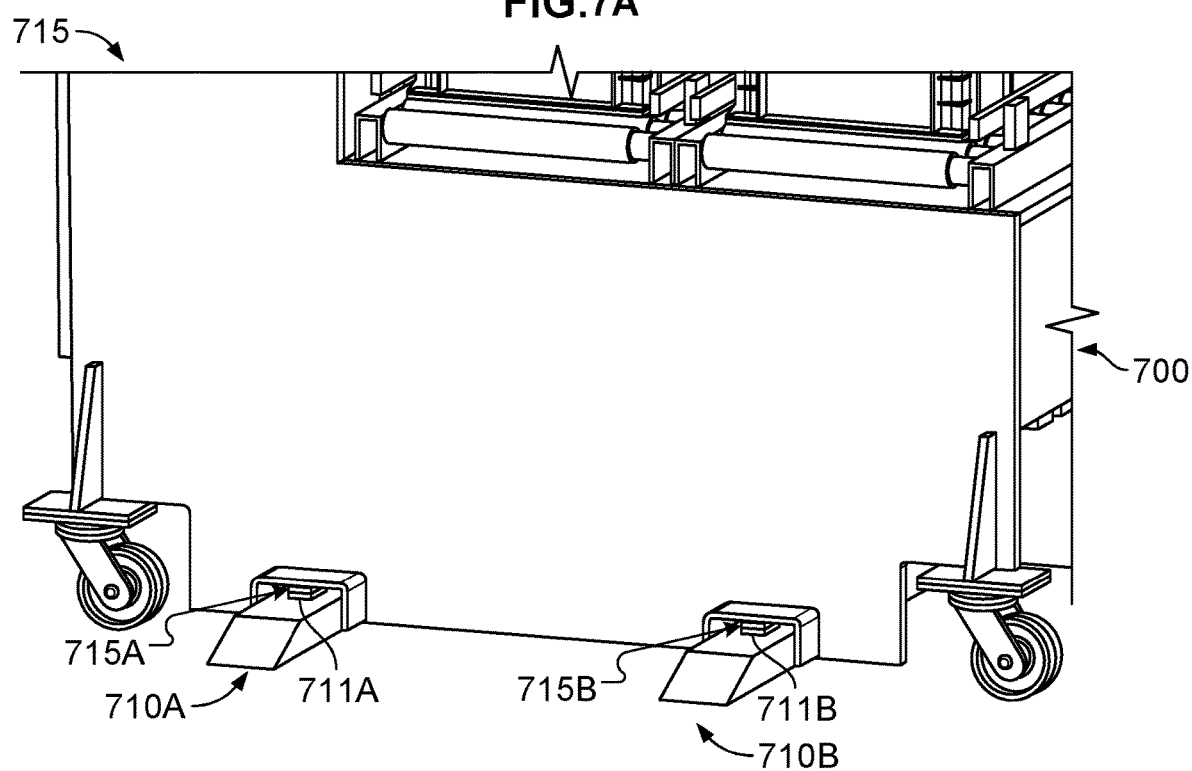
FIG. 7B is a diagram illustrating an example forklift AGV lifting a workcell and engaging connector pads of the workcell.

The forklift AGV 600 includes a pair of forks 610 configured to enter fork receiving areas 618A and 618B of the workcell 612 (or the fork receiving areas 628A and 628B of the workcell 622 or the fork receiving areas 638A and 638B of the workcell 632) and lift the workcell 612. Each workcell 612, 622, and 633 includes two pairs of fork receiving areas, one pair on each lateral side of the workcell 612, 622, and 633. This provides better stability when the forklift AGV 600 lifts the workcells. As shown in FIGS. 7A and 7B, the forks 610 can include connector pads that contact corresponding connector pads of the fork receiving areas on one side of the workcell 612, 622, or 632 to enable the forklift AGV 600 to charge the workcells 612, 622, and 632 and/or the workcells to charge the forklift AGV 600.

The workcells 612, 622, and 632, can be the same as or similar to the workcells 212, 222, and 232 of FIGS. 2A-2C, respectively. For example, the workcell 612 includes a robot arm 613 and a base 614 to which the robot arm 613 is attached and that supports the robot arm 613. The base 614 includes an area underneath and between its wheels for receiving a lifter AGV. The base 614 also includes a hitch receiver 615 for receiving a tow pin (or tow ball or hook) of a tugger AGV. The base 614 also includes fork receiving areas 618A and 618 for receiving forks of the forklift AGV 600.

The workcell 622 also includes a robot arm 623 which is a different type of robot arm and may have a different weight and the ability to perform different tasks than the robot arm 613. The workcell 622 also includes a base 624 that has an area underneath for receiving a lifter, a hitch receiver 625 for receiving a tow pin (or tow ball or hook) of a tugger AGV, and fork receiving areas 628A and 628 for receiving forks of the forklift AGV 600. Similarly, the workcell 632 includes a part scanning or inspection system 633, a base 634 that has an area underneath for receiving a lifter AGV, a hitch receiver 635 for receiving a tow pin (or tow ball or hook) of a tugger AGV, and fork receiving areas 638A and 638B for receiving forks of the forklift AGV 600.

FIG. 7A is a diagram illustrating an example forklift AGV 700 approaching a workcell 712. FIG. 7B is a diagram illustrating the forklift AGV 700 lifting the workcell 712 and engaging connector pads of the workcell 712. The forklift AGV 700 can be similar to, or the same as, the forklift AGV 600 of FIGS. 6A-46C. Similarly, the workcell 712 can be the same as, or similar to, either workcell 612, 622, or 632 of FIGS. 6A-6C.

The forklift AGV 700 includes a pair of forks 710A and 710B that includes connector pads 711A and 711B, respectively. The connector pads 711A and 711B are made of a conductive material and are attached to the batteries of the forklift AGV 700. The connector pads 711A and 711B are attached to the top side of the forks 710A and 710B so that the connector pads 711A and 711B can contact corresponding connector pads 715A and 715B of the workcell 712. The connector pads 715A and 715B of the workcell 712 are made of a conductive material and are attached to the bottom side of the fork receiving areas 718A and 718B on one side of the workcell 712. The connector pads 715A and 715B are connected to the batteries of the workcell 712.

The forklift AGV 700 can navigate the forks 710A and 710B into the fork receiving areas 718A and 718B until the connector pads 711A and 711B are directly over the connector pads 715A and 715B, respectively. For example, the conductive pads can include proximity sensors that alert the forklift AGV 700 when the connector pads 711A and 711B are directly over the connector pads 715A and 715B. The forklift AGV 700 can then lift the forks 710A and 710B to lift the workcell 712 and transport the workcell 712. As shown in FIG. 7B, when the workcell 712 is lifted, the connector pad 711A contacts the connector pad 715A and the connector pad 711B contacts the connector pad 715B. In this way, the forklift AGV 700 can charge the workcell 712 and/or the workcell 712 can charge the forklift AGV 700.

Figure 8:
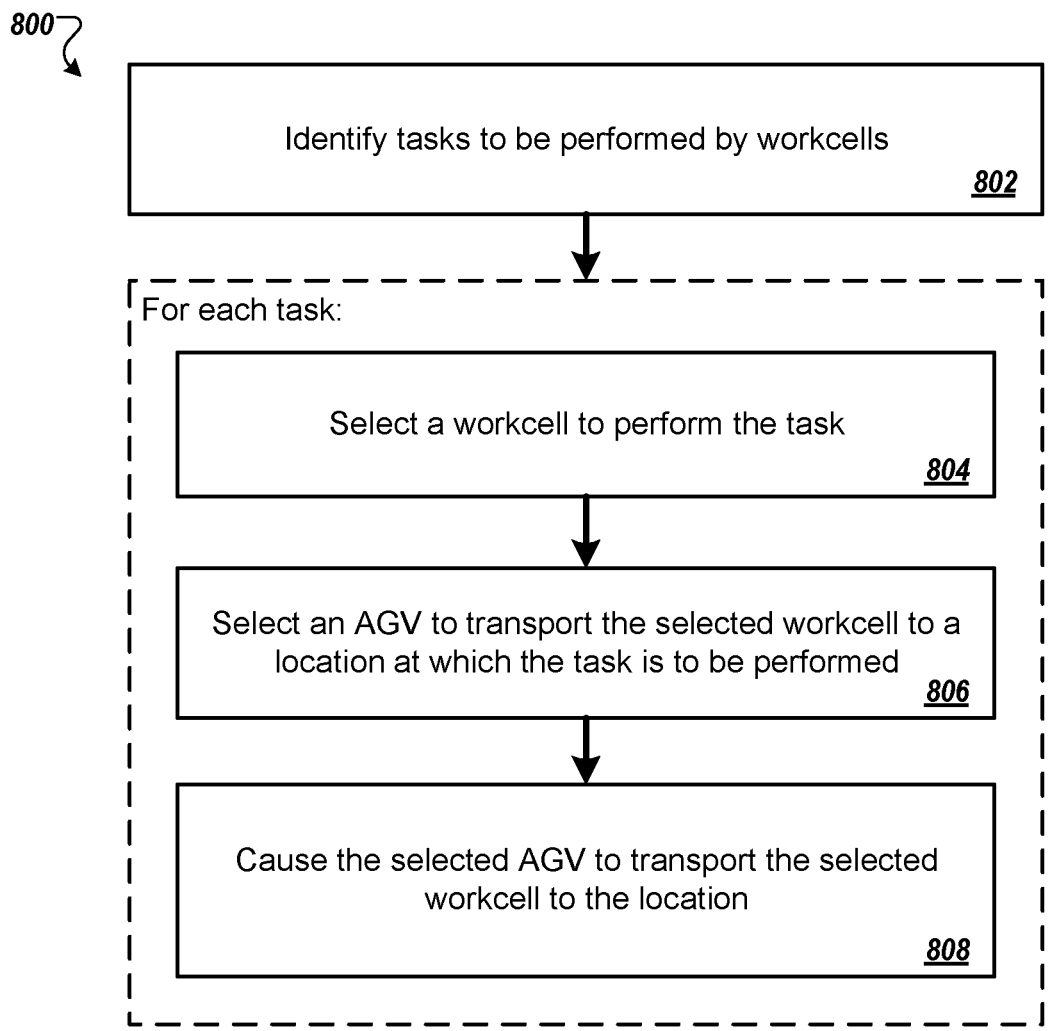
FIG. 8 is a flow diagram that illustrates an example process for controlling AGVs to transport workcells to the locations of tasks.

FIG. 8 is a flow diagram that illustrates an example process 800 for controlling AGVs to transport workcells to the locations of tasks. The process 800 can be implemented, for example, by the AGV controller 111 of FIG. 1. Operations of the process 800 can also be implemented as instructions stored on non-transitory computer readable media, and execution of the instructions by one or more data processing apparatus can cause the one or more data processing apparatus to perform the operations of the process 800.

Tasks to be performed by workcells are identified (802). The tasks can be tasks that require multiple different types of workcells that can perform different tasks. For example, some tasks can require a robot arm workcell while other tasks can require a product inspection or product labeler workcell.

Each workcell can be adapted to be transported by multiple different types of AGVs in a fleet of AGVs. For example, each workcell can include a base that includes multiple attachment or lift mechanisms for attaching to or being lifted by a AGVs. In a particular example, each workcell can include fork receiving areas for receiving forks of a forklift AGV, a hitch receiver for receiving a tow pin (or tow ball or hook) of a tugger AGV, and/or a lift area under the workcell for receiving a lifter AGV.

Each AGV in the fleet can be adapted to transporting multiple different types of workcells. For example, each AGV can include an electro-mechanical interface that connects to the attachment or lift mechanism of the various workcells. The electro-mechanical interface can include connector pads (or other conductive contacts) that are arranged to contact corresponding connector pads of the attachment or lift mechanisms of the workcells. The connector pads of the AGVs can be electrically connected to the batteries of the AGVs and the connector pads of the workcells can be electrically connected to the batteries of the workcells. This enables the AGVs to charge the workcells and/or the workcells to charge the AGVs.

For each task, a workcell is selected to perform the task (804). The workcell can be selected based on the tasks that each workcell performs. The workcell can also be selected based on the availability of the workcells that can perform the task, the location of the available workcells, whether other workcells or other obstacles obstruct a path between the available workcell and the location where the task is to be performed, the charge level of the batteries of the available workcells, and/or other appropriate factors.

For each task, an AGV is selected to transport the selected workcell to the location where the task is to be performed (806). The AGV can be selected based on whether the AGVs are capable of transporting the selected workcell, the availability of the capable AGVs, the location of the capable AGVs relative to the location of the selected workcell, the charge level of the capable AGVs, and/or other appropriate factors.

The selected AGV is instructed to transport the selected workcell to the location where the task is to be performed (808). For example, instructions specifying the selected workcell, the current location of the selected workload, and/or the destination location for the selected workcell can be sent to the selected AGV. The AGV can then navigate to the selected workcell, attach to or lift the selected workcell depending on the type of AGV that is selected, and transport the workcell from the current location to the destination location. In some implementations, the instructions can also specify the route that the AGV is to take from the current location to the destination location, e.g., to avoid obstacles such as other workcells or other AGVs.

During the transport of the workcell, the AGV can charge the batteries of the workcell or the workcell can charge the batteries of the AGV. The direction of charging can be selected based on various factors, such as the charge level of the batteries of the AGV, the charge level of the batteries of the workcell, whether the workcell will receive power from another source at the destination location, an estimated duration required for the workcell to perform its task, and or other appropriate factors, as described above.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method performed by one or more data processing apparatus, the method comprising:
    identifying a set of tasks to be performed by a set of workcells, wherein each workcell is adapted to perform one or more particular tasks and at least one workcell performs a different task than each other workcell; and
    for each task:
        selecting a workcell to perform the task based at least on the one or more particular tasks that each workcell is adapted to perform;
        selecting, from a set of autonomous guided vehicles (AGVs), an AGV to transport the selected workcell to a location at which the task is to be performed, wherein each AGV includes an electro-mechanical interface that is adapted to (i) connect to or lift multiple different types of workcells and (ii) provide charging power to or receive charging power from multiple different types of workcells; and
        causing the selected AGV to transport the selected workcell to the location at which the task is to be performed and provide charging power to or receive charging power from the selected workcell,
    wherein one or more of the workcells comprise a base having fork receiving areas for receiving forks of forklift AGVs, a tow hitch for receiving a tow pin of a tugger AGV, and a lift area for receiving a lifter AGV under the workcell.

2. The method of claim 1, wherein one or more fork receiving areas, the tow hitch, and the lift area each comprise one or more connector pads that are electrically connected to one or more batteries of the workcell, wherein each connector pad is configured to contact a corresponding connector pad of each AGV when the AGV is transporting the workcell.

3. The method of claim 1, further comprising determining a schedule that defines when each selected AGV will transport the selected workcell for each task based on (i) a location at which each workcell will be placed and (ii) physical limitations of navigating each AGV to the locations at which the tasks are to be performed.

4. The method of claim 1, wherein each AGV is configured to communicate with each workcell.

5. The method of claim 1, wherein the set of workcells includes at least one of a robot arm, a robot, a conveyor, or an inspection workcell.

6. A method, comprising:
    identifying a set of tasks to be performed by a set of workcells, wherein each workcell is adapted to perform one or more particular tasks and at least one workcell performs a different task than each other workcell;
    for each task:
        selecting a workcell to perform the task based at least on the one or more particular tasks that each workcell is adapted to perform;
        selecting, from a set of autonomous guided vehicles (AGVs), an AGV to transport the selected workcell to a location at which the task is to be performed, wherein each AGV includes an electro-mechanical interface that is adapted to (i) connect to or lift multiple different types of workcells and (ii) provide charging power to or receive charging power from multiple different types of workcells;
        causing the selected AGV to transport the selected workcell to the location at which the task is to be performed and provide charging power to or receive charging power from the selected workcell; and
        determining, for a particular AGV, whether to provide charging power to or receive charging power from a particular workcell that the particular AGV is transporting based on one or more of (i) a battery charge level of the AGV, (ii) a battery charge level of the particular workcell, or (iii) whether the particular workcell will receive power from another source at a location that the particular AGV will leave the workcell.

7. A method, comprising:
    identifying a set of tasks to be performed by a set of workcells, wherein each workcell is adapted to perform one or more particular tasks and at least one workcell performs a different task than each other workcell;
    for each task:
        selecting a workcell to perform the task based at least on the one or more particular tasks that each workcell is adapted to perform;

selecting, from a set of autonomous guided vehicles (AGVs), an AGV to transport the selected workcell to a location at which the task is to be performed, wherein each AGV includes an electro-mechanical interface that is adapted to (i) connect to or lift multiple different types of workcells and (ii) provide charging power to or receive charging power from multiple different types of workcells;

causing the selected AGV to transport the selected workcell to the location at which the task is to be performed and provide charging power to or receive charging power from the selected workcell; and for a particular task:
determining whether the selected workcell for the particular task can be left at the location at which the particular task is to be performed;
determining whether the selected workcell for the particular task has sufficient battery charge to complete the task; and
in response to determining that the selected workcell can be left at the location at which the particular task is to be performed, but that the selected workcell for the particular task does not have sufficient battery charge to complete the task, causing the selected AGV for the particular task to continue charging the selected workcell for the particular task while the task is being performed.

8. A method, comprising:
identifying a set of tasks to be performed by a set of workcells, wherein each workcell is adapted to perform one or more particular tasks and at least one workcell performs a different task than each other workcell; and for each task:
selecting a workcell to perform the task based at least on the one or more particular tasks that each workcell is adapted to perform;
selecting, from a set of autonomous guided vehicles (AGVs), an AGV to transport the selected workcell to a location at which the task is to be performed, wherein each AGV includes an electro-mechanical interface that is adapted to (i) connect to or lift multiple different types of workcells and (ii) provide charging power to or receive charging power from multiple different types of workcells;
causing the selected AGV to transport the selected workcell to the location at which the task is to be performed and provide charging power to or receive charging power from the selected workcell, wherein each AGV is configured to communicate with each workcell, and
wherein each AGV is configured to provide safety information to the workcell being transported by the AGV, wherein the safety information comprises instructions that cause moving parts of the workcell being transported by the AGV to remain stationary while the AGV is moving.

9. A system, comprising:
a first fleet of AGVs that each include electro-mechanical interface that is adapted to (i) connect to or lift multiple different types of workcells and (ii) provide charging power to or receive charging power from multiple different types of workcells;
a second fleet of multiple different types of workcells that are each adapted to perform one or more particular tasks, wherein at least one workcell in the second fleet performs a different task than each other workcell in the second fleet; and a control system configured to:
identify a set of tasks to be performed by the second fleet of workcells;
for each task:
select a workcell to perform the task based at least on the one or more particular tasks that each workcell is adapted to perform;
select an AGV to transport the selected workcell to a location at which the task is to be performed; and
provide, to the selected AGV, instructions that cause the selected AGV to transport the selected workcell to the location at which the task is to be performed and provide charging power to or receive charging power from the selected workcell through the electro-mechanical interface,
wherein one or more of the workcells comprise a base having fork receiving areas for receiving forks of forklift AGVs, a tow hitch for receiving a tow pin of a tugger AGV, and a lift area for receiving a lifter AGV under the workcell.

10. The system of claim 9, wherein one or more fork receiving areas, the tow hitch, and the lift area each comprise one or more connector pads that are electrically connected to one or more batteries of the workcell, wherein each connector pad is configured to contact a corresponding connector pad of each AGV when the AGV is transporting the workcell.

11. The system of claim 9, wherein the controller is further configured to determine a schedule that defines when each selected AGV will transport the selected workcell for each task based on (i) a location at which each workcell will be placed and (ii) physical limitations of navigating each AGV to the locations at which the tasks are to be performed.

12. The system of claim 9, wherein each AGV is configured to communicate with each workcell.

13. The system of claim 9, wherein the second fleet of workcells includes at least one of a robot arm, a robot, a conveyor, or an inspection workcell.

14. A system, comprising:
a first fleet of AGVs that each include electro-mechanical interface that is adapted to (i) connect to or lift multiple different types of workcells and (ii) provide charging power to or receive charging power from multiple different types of workcells;
a second fleet of multiple different types of workcells that are each adapted to perform one or more particular tasks, wherein at least one workcell in the second fleet performs a different task than each other workcell in the second fleet; and a control system configured to:
identify a set of tasks to be performed by the second fleet of workcells;
for each task:
select a workcell to perform the task based at least on the one or more particular tasks that each workcell is adapted to perform;
select an AGV to transport the selected workcell to a location at which the task is to be performed; and
provide, to the selected AGV, instructions that cause the selected AGV to transport the selected workcell to the location at which the task is to be performed and provide charging power to or receive charging power from the selected workcell through the electro-mechanical interface; and
determine, for a particular AGV, whether to provide charging power to or receive charging power from a particular workcell that the particular AGV is transporting based on one or more of (i) a battery charge level of the AGV, (ii) a battery charge level of the particular workcell, or (iii) whether the particular workcell will receive power from another source at a location that the particular AGV will leave the workcell.

15. A system, comprising:
a first fleet of AGVs that each include electro-mechanical interface that is adapted to (i) connect to or lift multiple different types of workcells and (ii) provide charging power to or receive charging power from multiple different types of workcells;
a second fleet of multiple different types of workcells that are each adapted to perform one or more particular tasks, wherein at least one workcell in the second fleet performs a different task than each other workcell in the second fleet; and
a control system configured to:
identify a set of tasks to be performed by the second fleet of workcells;
for each task:
select a workcell to perform the task based at least on the one or more particular tasks that each workcell is adapted to perform;
select an AGV to transport the selected workcell to a location at which the task is to be performed; and
provide, to the selected AGV, instructions that cause the selected AGV to transport the selected workcell to the location at which the task is to be performed and provide charging power to or receive charging power from the selected workcell through the electro-mechanical interface; and
for a particular task:
determine whether the selected workcell for the particular task can be left at the location at which the particular task is to be performed;
determine whether the selected workcell for the particular task has sufficient battery charge to complete the task; and
in response to determining that the selected workcell can be left at the location at which the particular task is to be performed, but that the selected workcell for the particular task does not have sufficient battery charge to complete the task, causing the selected AGV for the particular task to continue charging the selected workcell for the particular task while the task is being performed.

16. A system, comprising:
a first fleet of AGVs that each include electro-mechanical interface that is adapted to (i) connect to or lift multiple different types of workcells and (ii) provide charging power to or receive charging power from multiple different types of workcells;
a second fleet of multiple different types of workcells that are each adapted to perform one or more particular tasks, wherein at least one workcell in the second fleet performs a different task than each other workcell in the second fleet; and
a control system configured to:
identify a set of tasks to be performed by the second fleet of workcells;
for each task:
select a workcell to perform the task based at least on the one or more particular tasks that each workcell is adapted to perform;
select an AGV to transport the selected workcell to a location at which the task is to be performed; and
provide, to the selected AGV, instructions that cause the selected AGV to transport the selected workcell to the location at which the task is to be performed and provide charging power to or receive charging power from the selected workcell through the electro-mechanical interface,
wherein each AGV is configured to communicate with each workcell, and
wherein each AGV is configured to provide safety information to the workcell being transported by the AGV, wherein the safety information comprises instructions that cause moving parts of the workcell being transported by the AGV to remain stationary while the AGV is moving.

17. A system comprising:
a data processing apparatus; and
a memory storage apparatus in data communication with the data processing apparatus, the memory storage apparatus storing instructions executable by the data processing apparatus and that upon such execution cause the data processing apparatus to perform operations comprising:
identifying a set of tasks to be performed by a set of workcells, wherein each workcell is adapted to perform one or more particular tasks and at least one workcell performs a different task than each other workcell;
for each task:
selecting a workcell to perform the task based at least on the one or more particular tasks that each workcell is adapted to perform;
selecting, from a set of autonomous guided vehicles (AGVs), an AGV to transport the selected workcell to a location at which the task is to be performed, wherein each AGV includes an electro-mechanical interface that is adapted to (i) connect to or lift multiple different types of workcells and (ii) provide charging power to or receive charging power from multiple different types of workcells; and
causing the selected AGV to transport the selected workcell to the location at which the task is to be performed and provide charging power to or receive charging power from the selected workcell,
wherein one or more of the workcells comprise a base having fork receiving areas for receiving forks of forklift AGVs, a tow hitch for receiving a tow pin of a tugger AGV, and a lift area for receiving a lifter AGV under the workcell.

* * * * *